United States Patent
Houston et al.

(10) Patent No.: US 9,468,962 B2
(45) Date of Patent: Oct. 18, 2016

(54) STRUCTURAL COMPONENT AND METHOD OF MANUFACTURE

(75) Inventors: Thomas Sandy Houston, Waxhaw, NC (US); John E. Owens, Jr., Charlotte, NC (US); Larry A. Polen, Matthews, NC (US)

(73) Assignee: CYRIL BATH COMPANY, Monroe, NC (US)

( * ) Notice: Subject to any disclaimer, the term of this patent is extended or adjusted under 35 U.S.C. 154(b) by 843 days.

(21) Appl. No.: 13/279,108

(22) Filed: Oct. 21, 2011

(65) Prior Publication Data

US 2012/0100387 A1    Apr. 26, 2012

Related U.S. Application Data

(60) Provisional application No. 61/405,914, filed on Oct. 22, 2010.

(51) Int. Cl.
| | |
|---|---|
| *B21D 7/00* | (2006.01) |
| *B21D 47/01* | (2006.01) |
| *B23K 20/12* | (2006.01) |
| *C22C 14/00* | (2006.01) |
| *B21D 7/022* | (2006.01) |
| *B23K 20/233* | (2006.01) |

(Continued)

(52) U.S. Cl.
CPC ............... *B21D 7/022* (2013.01); *B21D 47/01* (2013.01); *B23K 20/1205* (2013.01); *B23K 20/2336* (2013.01); *B32B 15/017* (2013.01); *C22C 14/00* (2013.01); *C22C 21/00* (2013.01); *B23K 2203/10* (2013.01); *B32B 2605/18* (2013.01); *Y10T 29/49616* (2015.01); *Y10T 428/1241* (2015.01); *Y10T 428/24628* (2015.01)

(58) Field of Classification Search
USPC ......................................... 428/603, 654, 651
See application file for complete search history.

(56) References Cited

U.S. PATENT DOCUMENTS

| | | | |
|---|---|---|---|
| 4,087,038 A | 5/1978 | Yagi | |
| 4,129,974 A | 12/1978 | Ojalvo | |
| 6,079,609 A | 6/2000 | Fochtman | |

(Continued)

FOREIGN PATENT DOCUMENTS

| | | |
|---|---|---|
| CN | 101297056 A | 10/2008 |
| CN | 101323049 A | 12/2008 |

(Continued)

OTHER PUBLICATIONS

International Preliminary Report on Patentability for International Patent Application No. PCT/US2011/057375 dated Apr. 23, 2013.

(Continued)

*Primary Examiner* — Humera Sheikh
*Assistant Examiner* — Lucas Wang
(74) *Attorney, Agent, or Firm* — Moore & Van Allen PLLC; Henry B. Ward, III

(57) ABSTRACT

A structural component is provided comprising a base member comprising at least two sidewalls and a space therebetween, the base member having a predetermined curvilinear configuration formed using hot stretch forming. The structural component comprises at least one reinforcing member linear friction welded to the at least two sidewalls so that the reinforcing member is positioned at least partially within the space between the at least two sidewalls.

21 Claims, 6 Drawing Sheets

(51) Int. Cl.
  *B32B 15/01* (2006.01)
  *C22C 21/00* (2006.01)

(56) References Cited

U.S. PATENT DOCUMENTS

| | | | |
|---|---|---|---|
| 6,328,261 | B1 | 12/2001 | Wollaston et al. |
| 6,450,394 | B1 | 9/2002 | Wollaston et al. |
| 6,910,616 | B2 | 6/2005 | Halley et al. |
| 7,234,668 | B2 | 6/2007 | Wollaston et al. |
| 7,624,907 | B2 | 12/2009 | Alessi et al. |
| 7,669,452 | B2 | 3/2010 | Polen et al. |
| 7,882,996 | B2 | 2/2011 | Alessi et al. |
| 8,037,730 | B2 | 10/2011 | Polen et al. |
| 2005/0284045 | A1 | 12/2005 | Smith |
| 2007/0102493 | A1* | 5/2007 | Polen et al. ............ 228/136 |
| 2008/0308611 | A1* | 12/2008 | Alessi et al. ............ 228/112.1 |
| 2009/0321497 | A1 | 12/2009 | Alessi et al. |
| 2010/0107720 | A1 | 5/2010 | Polen et al. |
| 2010/0212392 | A1* | 8/2010 | Schier et al. ............ 72/413 |
| 2012/0100387 | A1 | 4/2012 | Houston et al. |

FOREIGN PATENT DOCUMENTS

| | | |
|---|---|---|
| EP | 2 629 904 A2 | 8/2013 |
| JP | S57-11731 | 1/1982 |
| JP | 2008307605 A | 12/2008 |
| JP | 2009514679 A | 4/2009 |
| KR | 10-2008-0110520 | 12/2008 |
| SU | 1611547 A1 | 12/1990 |
| WO | WO 2007/056663 A2 | 5/2007 |
| WO | WO 2012/054889 A2 | 4/2012 |
| WO | WO 2013/086006 A1 | 6/2013 |
| WO | WO 2014/084955 A1 | 6/2014 |

OTHER PUBLICATIONS

International Search Report and Written Opinion for International Patent Application No. PCT/US2011/057375; Jun. 11, 2012.

The State Intellectual Property Office of the People's Republic of China. Chinese Office Action and Search Report dated Sep. 1, 2014. Chinese Patent Application No. 201180062011.7. Name of Applicant: Cyril Bath Company. Chinese Language. 9 pages.

Russian Patent Office. Russian Office Action dated Jul. 2, 2014. Russian Patent Application No. 2013123284/02. Name of Applicant: Cyril Bath Company, US. Russian Language and English Translation. 6 pages.

Korean Intellectual Property Office. Korean Office Action dated Jul. 22, 2014. Korean Application No. 10-2013-7012925. Name of Applicant: Cyril Bath Company. Korean Language. 29 pages.

Australian Government IP Australia. First AU Examination Report dated Mar. 11, 2015. Australia Patent Application No. 2011316823. Filed: Oct. 21, 2011. Name of Applicant: Cyril Bath Company. English Language. 3 pages.

The Canadian Intellectual Property Office. Canadian Office Action dated Nov. 7, 2014 and Examination Search Report dated Oct. 31, 2014. Canadian Patent Application No. 2,818,324. Name of Applicant: Cyril Bath Company. English Language. 3pages.

Russia Federal Service on Intellectual Property. Russian Decision on Grant dated Nov. 18, 2014. Russian Patent Application No. 2013123284/02. Name of Applicant: Cyril Bath Company. Russian and English Language Translation. 13pages.

Korean Intellectual Property Office. Korean Notice of Final Rejection dated Jan. 16, 2015. Korean Application No. 10-2013-7012925. Name of Applicant: Cyril Bath Company. Korean and English Language Translation. 6 pages.

Japanese Patent Office, Japanese Office Action dated Oct. 6, 2015. Japanese Application No. 2013-535131. English and Japanese Language. 19 pages.

Chinese Patent Office. Chinese Office Action dated Jan. 5, 2016. Chinese Application No. 2011800620117. English and Chinese Language. 17 pages.

The State Intellectual Property Office of the People's Republic of China. Second Chinese Office Action dated May 5, 2015. Chinese Application No. 2011800620117. Name of Applicant: Cyril Bath Company. English and Chinese Language. 13 pages.

* cited by examiner

STRUCTURAL COMPONENT AND METHOD OF MANUFACTURE

FIELD

The invention generally relates to the field of structural components, and more particularly, embodiments of the present invention relate to an improved structural component comprising a base member and at least one reinforcing member affixed thereto and methods of manufacture therefor.

BACKGROUND

Various industries, including the aerospace industry, have a need for complex structural components that are relatively free of residual stresses and are capable of being machined without failing. In particular, there is a need for curved finish machined components having generally L-shaped or U-shaped cross-sectional profiles that include various features that cause inconsistencies in the cross-sectional profile along the length of the component, such as gussets, fins, and tabs. Unfortunately, forming an L-shaped or U-shaped piece into a curved component and adding gussets, fins, and tabs using conventional methods such as forging, laser welding, fusion welding, and other known methods results in a finished component that has unacceptable levels of residual stress that remain in the component due, in principal part, to the inhomogenous deformation to which the component has been subjected during the forming and manufacturing process. Components having residual stresses are prone to failure and/or shape changes during further machining or use, and has weaker bonds between the base piece and the combined elements than would be preferred. Because of these drawbacks, these components must be formed by utilizing an original extrusion or rolled shape that includes the additional features over the entire length of the piece, and removing material from the piece as needed to define the desired features. This method not only significantly increases the weight and cost of the raw material required to manufacture the component, but also substantially increases the amount of time required to manufacture the component, as removing the unnecessary material from the rest of the cross section during final machining is a timely process requiring relative expensive machinery and skilled expertise. Thus, there remains a need for improved structural components and methods of manufacture of structural components that reduce both the amount of raw material required and the subsequent machining operations.

SUMMARY

The present invention provides structural components and associated methods of manufacture. According to one embodiment, the method for manufacturing a structural component comprises forming a base member such that the base member comprises at least two sidewalls and a space therebetween. The base member is hot stretch formed so that the base member has a predetermined curvilinear configuration. At least one reinforcing member is linear friction welded to the at least two sidewalls so that the reinforcing member is positioned at least partially within the space between the at least two sidewalls.

According to another embodiment of the present invention, the method for manufacturing a structural component comprises positioning a profile comprising at least two sidewalls and a space therebetween in a heat-insulating enclosure in which a die is disposed such that the profile is in forming proximity to the die. The profile is resistance heated to a working temperature by passing electrical current through the profile. The profile and die are moved relative to each other while the profile is at the working temperature, thereby forming a base member having a predetermined curvilinear configuration. The curvilinear base member is mounted on a mounting assembly. A reinforcing member is affixed to the at least two sidewalls using linear friction welding so that the reinforcing member is positioned at least partially within the space between the at least two sidewalls. In one embodiment, the affixing step comprises positioning the reinforcing member in contact with the base member to define a first interface between the reinforcing member and a first sidewall and a second interface between the reinforcing member and a second sidewall; applying a first forge load at an angle relative to the first weld interface and a second forge load at an angle relative to the second weld interface, the first and second forge loads having predetermined magnitudes; oscillating the reinforcing member at a predetermined oscillation amplitude to heat the reinforcing member and the base member; reducing the oscillation amplitude to zero; and increasing the first and second forge loads to predetermined set-points and maintaining for a predetermined period of time; and reducing the first and second forge loads to zero.

According to one embodiment of the methods disclosed herein, at least one of the base member is and reinforcing member is formed of titanium or a titanium alloy. According to another embodiment of the methods disclosed herein, at least one of the base member and reinforcing member is formed of aluminum or an aluminum alloy. According to another embodiment of the methods disclosed herein, the base member and reinforcing member are formed of the same material. According to yet another embodiment of the methods disclosed herein, the base member and reinforcing member are formed of different materials.

According to one embodiment of the present invention, the structural component comprises a base member comprising at least two sidewalls and a space therebetween, the base member having a predetermined curvilinear configuration formed using hot stretch forming. The structural component further comprises at least one reinforcing member linear friction welded to the at least two sidewalls so that the reinforcing member is positioned at least partially within the space between the at least two sidewalls.

According to another embodiment of the present invention, the structural component comprises a base member, wherein the base member is formed by positioning a profile comprising at least two sidewalls and a space therebetween in a heat-insulating enclosure in which a die is disposed such that the profile is in forming proximity to the die; resistance heating the profile to a working temperature by passing electrical current through the profile; and moving the profile and the die relative to each other while the profile is at the working temperature. The structural component comprises at least one reinforcing member affixed to the base member, wherein the reinforcing member is affixed by: positioning the reinforcing member in contact with the base member to define a first interface between the reinforcing member and a first sidewall and a second interface between the reinforcing member and a second sidewall; applying a first forge load at an angle relative to the first weld interface and a second forge load at an angle relative to the second weld interface, the first and second forge loads having predetermined magnitudes; oscillating the reinforcing member at a predetermined oscillation amplitude to heat the reinforcing member and the base member; reducing the oscillation amplitude to zero; increasing the first and second forge loads to predetermined set-points and maintaining for a predetermined period of time; and reducing the first and second forge loads to zero.

According to one embodiment of the present invention, at least one of the base member and the reinforcing member is formed of titanium or a titanium alloy. According to another embodiment of the present invention, at least one of the base member and the reinforcing member is formed of aluminum or an aluminum alloy. According to another embodiment of the present invention, the base member and reinforcing member are formed of the same material. According to yet another embodiment of the present invention, the base member and reinforcing member are formed of different materials.

Thus, there has been provided improved structural components and methods of manufacture of structural components that reduce both the amount of raw material required and the subsequent machining operations.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
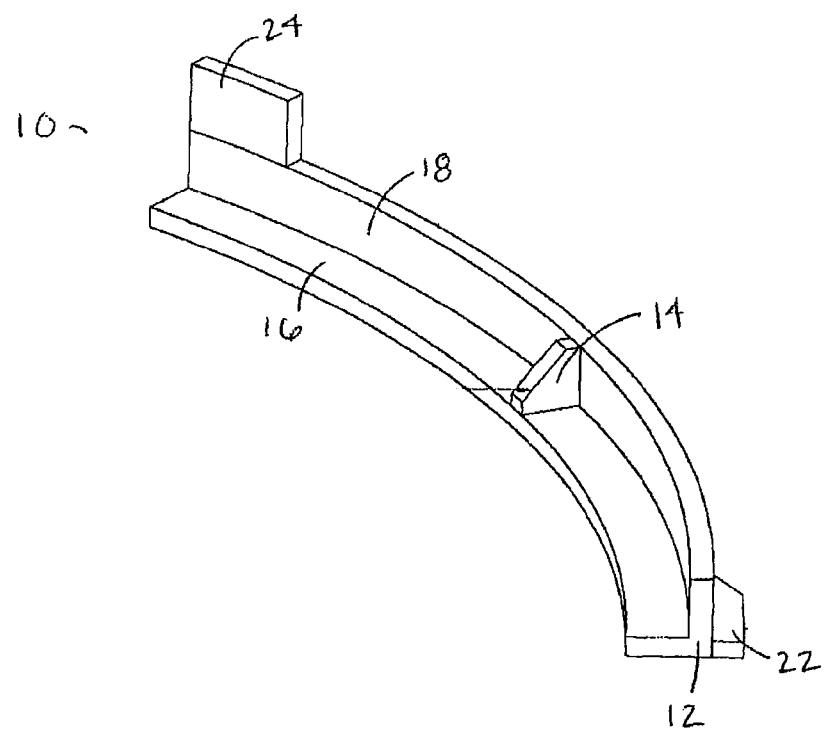
FIG. 1 is a perspective view illustrating a structural component, according to one embodiment of the present invention.

Referring to FIG. 1, a structural component 10 in accordance with embodiments of the present invention is provided. According to some embodiments, and as shown in FIG. 1, the structural component 10 comprises a base member 12 and at least one reinforcing member 14. In some embodiments, the structural component 10 comprises a plurality of reinforcing members 14. In some embodiments, the structural component 10 is comprised of metal. For example, the base member 12 and/or the at least one reinforcing member 14 may be comprised of titanium or a titanium alloy. In another embodiment, the base member 12 and/or the at least one reinforcing member 14 may be comprised of aluminum or an aluminum alloy In some embodiments, the base member 12 comprises a bottom wall 16 and one or more sidewalls 18 such that the cross-sectional profile of the base member 12 is an L-shape, a U-shape, a C-shape, a T-shape, or any other shape defining an open area within which reinforcing members 14 may be affixed to the base member 12. Although the terms "bottom wall" and "sidewall" are used herein to refer to portions of the base member 12, these terms are not being used to denote any particular directional orientation for the base member, i.e., the "bottom wall" and/or the "sidewall" each comprises a generic "sidewall" that can comprise a lateral sidewall, top wall or bottom wall when the base member is installed in its intended operating environment and orientation. According to some embodiments, and as shown in FIG. 1, the base member 12 has a curvilinear shape such that the base member 12 is curved about one or more axes normal to the plane of the bottom wall 16, where the bottom wall 16 remains substantially planar. In some embodiments, the structural component 10 may further comprise one or more tabs 22 or fins 24 or other protuberances. Such tabs 22 and fins 24 or protuberance may be formed integrally with the base member 12 or may be affixed to the base member 12 as discussed in more detail below.

Figure 2:
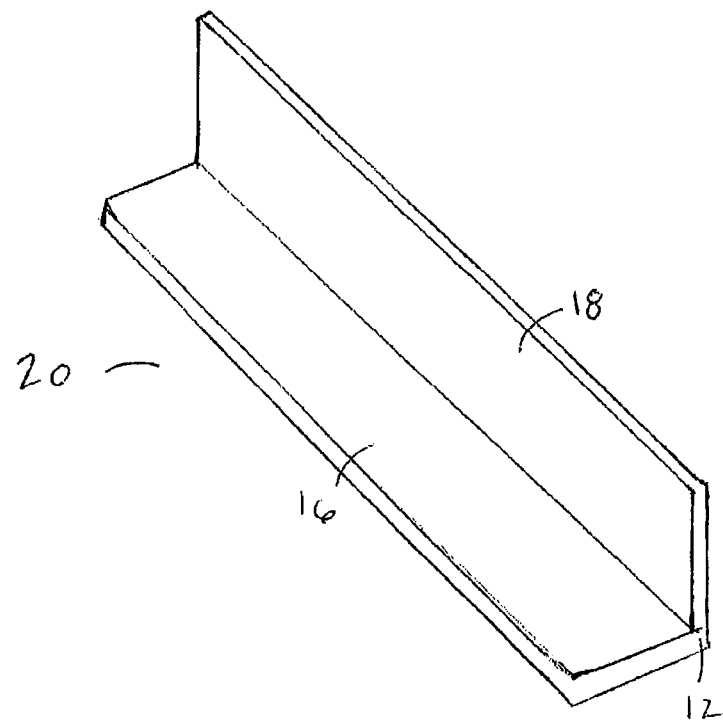
FIG. 2 is a perspective view illustrating a profile, according to one embodiment of the present invention.

According to some embodiments, the base member 12 is formed by applying a stretch forming process to a profile 20, i.e., a piece of material, such as metal. The profile 20 may be formed through extrusion, a roll-forged method, or other manufacturing process. Thus, in some embodiments, the base member 12 is formed from a profile having the desired cross-sectional shape for the base member 12, as defined by a bottom wall 16 and one or more sidewalls 18. As illustrated in FIG. 2, the profile 20 has a substantially straight shape prior to forming. In order to achieve the curvilinear shape of the base member 12, the profile 20 is heated and formed within a stretch forming apparatus. See U.S. Pat. No. 7,669, 452 to Polen et al. for a general discussion of stretch forming, the entire contents of which are incorporated herein by reference.

Figure 3:
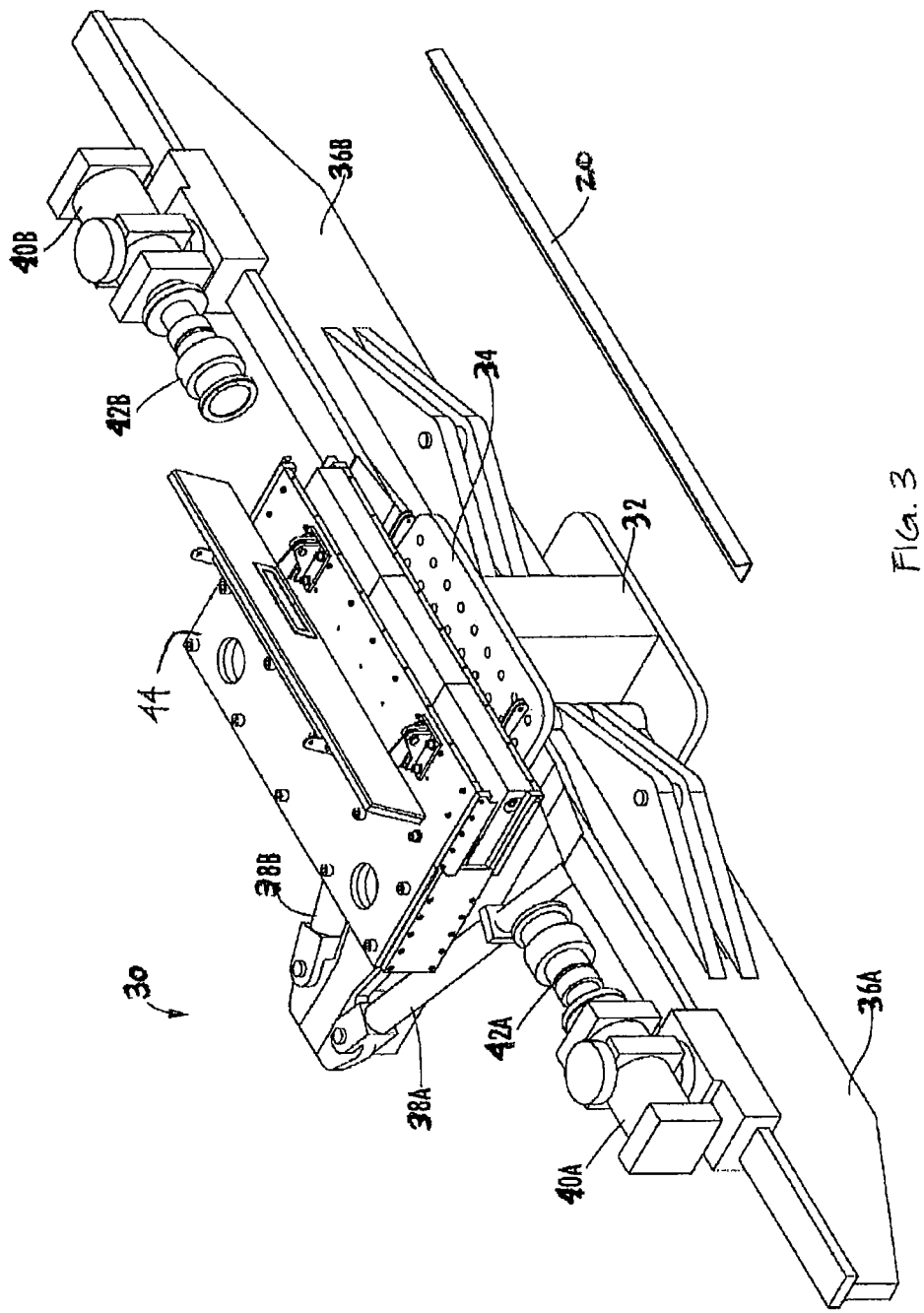
FIG. 3 is a perspective view illustrating a stretching forming apparatus that can be used to form the profile of FIG. 2, according to one embodiment of the present invention.
Figure 4:
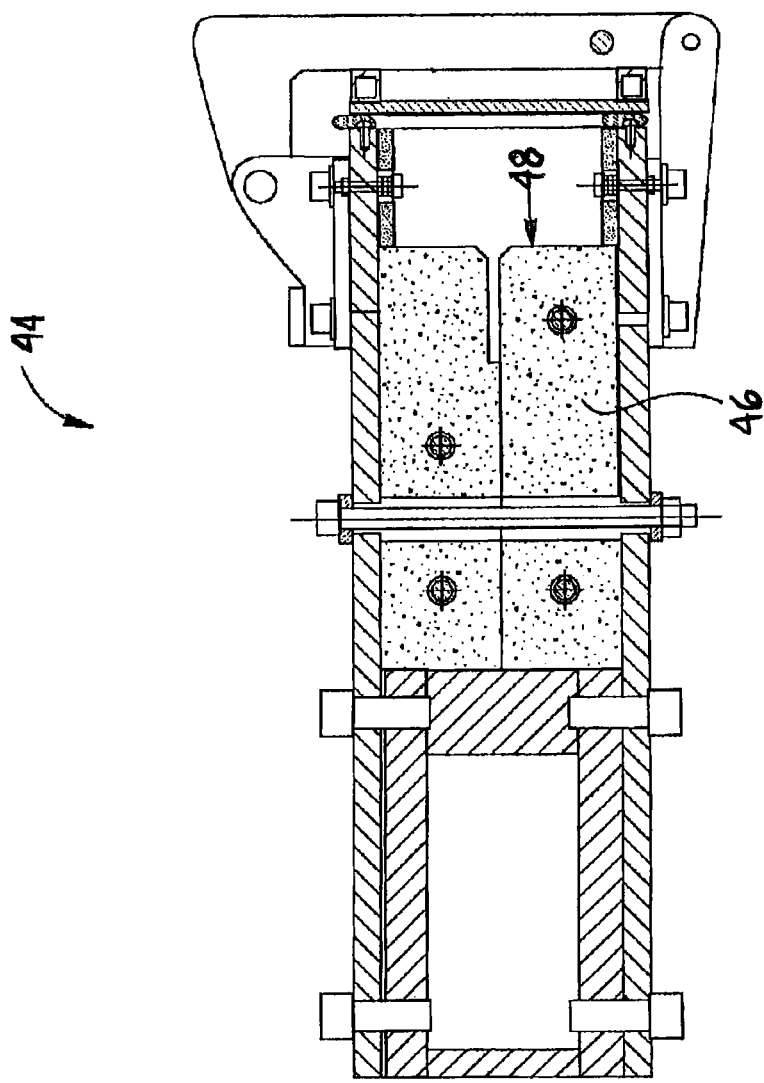
FIG. 4 is a partial-cutaway view illustrating a die that is disposed inside a die enclosure of the stretch forming apparatus of FIG. 3, according to one embodiment of the present invention.

According to some embodiments, and as illustrated in FIG. 3, the stretch forming apparatus 30 comprises a main frame 32, a die mounting surface 34, and first and second opposed swing arms 36A, 36B (also referred to herein as swing arms 36). The swing arms 36 are pivotally mounted to the main frame 32 and are coupled to hydraulic forming cylinders 38A, 38B or 38, and carry hydraulic tension cylinders 40A, 40B (also referred to herein as tension cylinders 40), which in turn have hydraulically operable opposed jaw assemblies 42A, 42B (also referred to herein as jaws 42) mounted thereto. Appropriate pumps, valving, and control components may be provided for supplying pressurized hydraulic fluid to the forming cylinders 38, tension cylinders 40, and jaws 42A, 42B. In addition to the foregoing components, a heat-insulating die enclosure 44 is mounted to the die mounting surface 34 between the jaw assemblies 42A and 42B. In some embodiments, the die enclosure 44 comprises first and second aligned and opposed openings that are configured to accommodate the ends of the profile 20. Furthermore, the die enclosure 44 may be opened to place the profile 20 therein and remove it therefrom, but when closed is fully enclosed except for the two openings for the ends of the profile 20. In some embodiments, and with reference now to FIG. 4, a die 46 is disposed inside the die enclosure 44. The die 46 is a relatively massive body with a working face 48 that is shaped so that a selected curve is imparted to the profile 20 as it is bent around the die 46, as described in more detail below. According to some embodiments, the cross-section of the working face 48 generally conforms to the cross-sectional shape of the profile 20, such that the profile 20 may be placed flush against the working face 48 of the die 46.

According to some embodiments, in order to form the profile 20 into the base member 12 of the structural component 10 using the stretch forming apparatus 30, the profile 20 is positioned in the die enclosure 44 in forming proximity to the working face 48 of the die 46. The profile 20 is placed in the die enclosure 44 such that the opposite ends of the profile 20 extend through the respective first and second openings of the die enclosure 44 and the remaining portion of the profile 20 is substantially fully enclosed within the die enclosure 44. The jaws 42 are then clamped down against the respective opposite ends of the profile 20 that are protruding from the openings in the die enclosure 44. According to some embodiments, the profile 20 is electrically insulated from the components of the assembly 30, including the jaws 42 and the die 46. For example, the die 46 may be constructed from multiple pieces of a ceramic material such as fused silica. The die 46 may also be fabricated from other refractory materials, or from non-insulating materials which are then coated or encased by an insulating layer Once the profile 20 is placed in the assembly and the jaws 42 are clamped on the opposing ends, according to some embodiments, current is passed through the profile 20, causing resistance heating thereof. A connector from a current source may be placed on each end of the profile 20 to provide the resistance heating. In other embodiments, the heating current connection may be directly through the jaws 42, as described above. By using thermocouples or other temperature-sensing devices, the current source can be programmable-logic-controller ("PLC") controlled using a temperature feedback signal. This will allow proper ramp rates for rapid but uniform heating, as well as allow for the retardation of current once the profile 20 reaches the target temperature. A proportional-integral-derivative ("PID") control loop of a known type can be provided to allow for adjustments to be automatically made as the temperature of the profile 20 varies during the forming cycle. This control may be active and programmable during the forming cycle. Thus, closed loop controlled heating of profile 20 continues, utilizing feedback from the thermocouples or other temperature sensors, until the desired working temperature set point is reached. The rate of heating of the profile 20 to the set point is determined taking into account the cross-section and length of the profile 20, as well as relevant thermocouple feedback. During the stretch-forming operation, the profile 20 will be heated to temperatures of about 538 degrees Celsius (about 1000 degrees Fahrenheit) or greater.

Once the working temperature has been reached, forming of the profile 20 into the base member 12 can begin. According to some embodiments, the tension cylinders 40 stretch the profile 20 longitudinally to the desired point, and the forming cylinders 38 pivot the swing arms 36 inward to wrap the profile 20 against the die 46 while the working temperature is controlled as required. Thus, the die 46 imparts the curvilinear shape to the base member 12. The stretch rates, dwell times at various positions, and temperature changes can be controlled via feedback to the control system during the forming process. Once position feedback from the swing arms 36 indicates that the profile 20 has arrived at its final position, the control system maintains position and/or tension force until the profile 20 is ready to be released. Until that set point is reached, the control system will continue to heat and form the profile 20 around the die. Creep forming may be induced by maintaining the profile 20 against the die 46 for a selected dwell time while the temperature is controlled as needed.

According to some embodiments, the profile 20 is allowed to cool at a rate slower than natural cooling by adding supplemental heat via the current source. This rate of temperature reduction is programmed and will allow the profile 20 to cool while monitoring it via temperature feedback. Once the temperature has arrived at its final set point, force on the profile 20 is released and the flow of current from the current source stops. After the force is removed from the profile 20, the jaws 42 may be opened, all electrical connectors may be removed, and the fully formed base member 12 may be removed from the assembly 30.

It should be understood that, in some embodiments of the present invention, the base member 12 may be formed from the profile 20 using a stretch forming process that does not include heating the profile 20 prior to forming. Indeed, in some embodiments, the heating and cooling processes described above may not be utilized to form the base member 12. In particular, according to some embodiments, no heat is applied to the profile 20, whether through resistance heating by the stretch forming apparatus 30 or otherwise, and the profile 20 is formed against the die 46 to create the base member 12 without reaching a minimum working temperature or otherwise controlling the temperature of the profile 20. Thus, in such embodiments, the forming of the base member 12 from the profile 20 would occur at the ambient temperature at the location of the stretch forming apparatus 30. But in case, whether or not heat and/or cooling process are employed, the resultant base member 12 preferably has substantially no residual stress, including, without limitation, tensile residual stresses on the surface of the base member.

Once the base member 12 of the structural component 10 has been formed using the process described above, the one or more reinforcing members 14 are affixed to the base member 12. According to some embodiments, each reinforcing member 14 is affixed to the base member 12 using linear friction welding. According to different embodiments, a single forge axis or a dual forge axis linear friction welding process may be utilized. This welding process allows for two (2) pieces of metal to be joined via localized heating from friction generated from oscillating linear motion between the two pieces, along with a forging force which can be applied in one or two directions. See U.S. Pat. No. 7,624,907 to Alessi et al. for a general discussion of dual forge axis linear friction welding, the entire contents of which are incorporated herein by reference.

Figure 5:
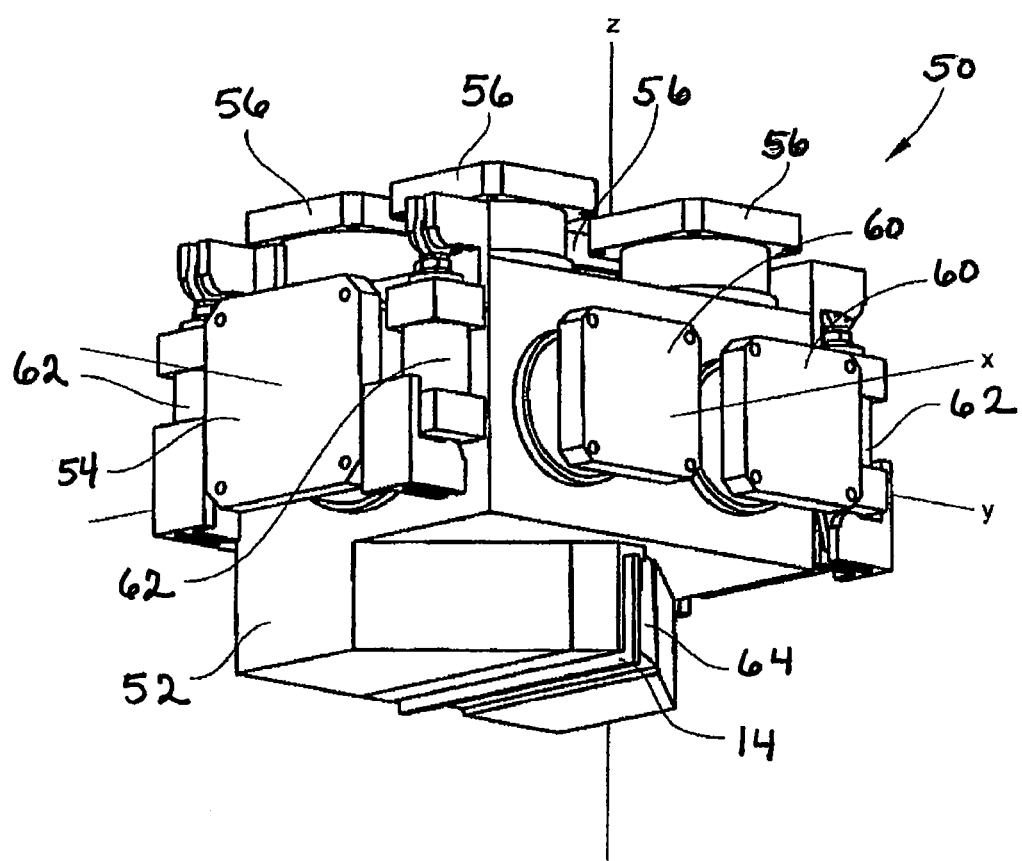
FIG. 5 is a perspective view illustrating a linear friction welding machine, according to one embodiment of the present invention.
Figure 6:
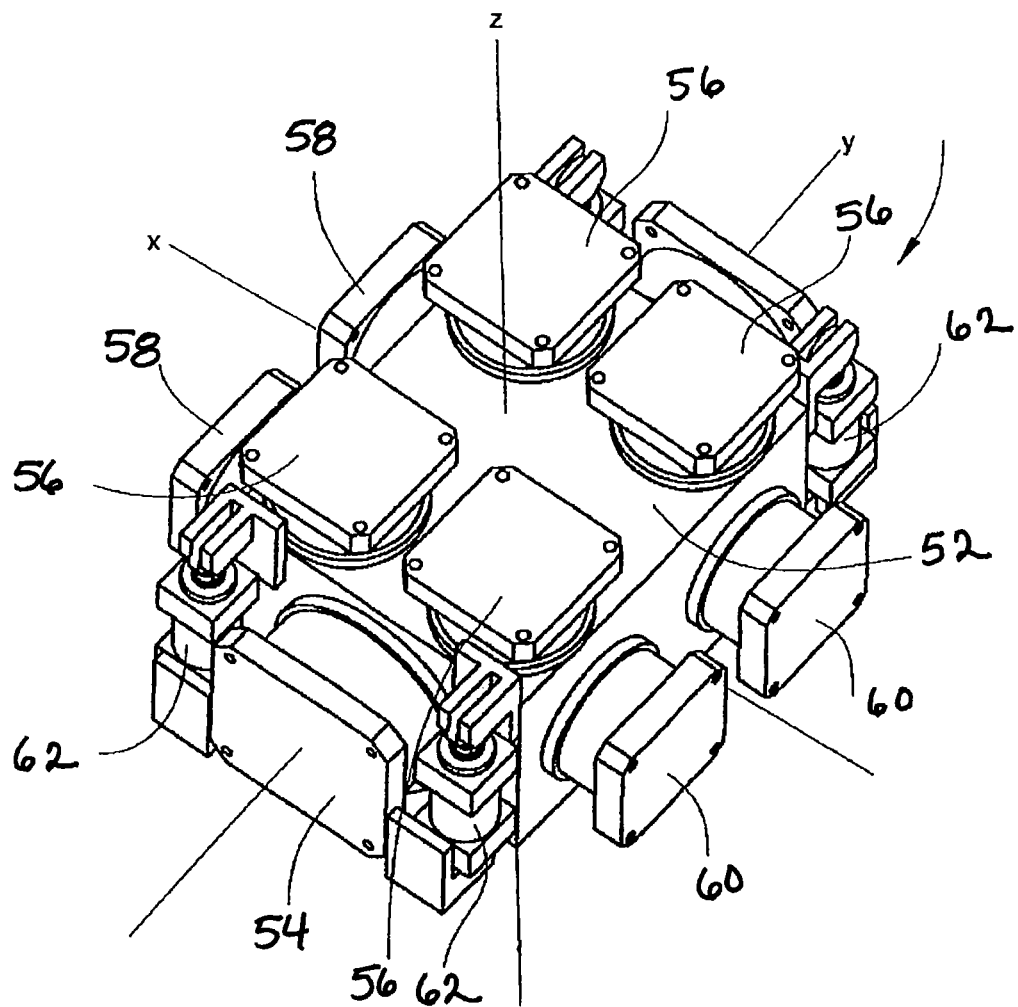
FIG. 6 is a perspective view illustrating the linear friction welding machine of FIG. 1.

According to some embodiments, a linear friction welding machine may be utilized to accomplish the linear friction welding process. In some embodiments, the linear friction welding machine comprises a welding head that is operable for providing the oscillation and either single axis or dual axis forge loading forces that produce the welds that affix the reinforcing members 14 to the base member 12. As shown in FIGS. 5 and 6, a welding head 50 of a dual forge axis linear friction welding machine includes an oscillation block 52 for supporting other components. According to some embodiments, two (2) Y-axis oscillation hydrostatic bearing actuators 54 are provided on opposite lateral sides of the oscillation block 52 and are supported therein, and four (4) Z-axis forge hydrostatic bearing actuators 56 are provided on a top surface of the oscillation block 52 for providing the forge load along the first forge axis, the Z-axis. Two (2)

X-axis hydrostatic forge actuators 58 are provided along one lateral side of the oscillation block 52 for providing forge load along the second forge axis, the X-axis. Two (2) X-axis counter-load hydrostatic bearing actuators 60 oppose the two (2) X-axis hydrostatic forge actuators 58 for countering the forge load of the X-axis forge actuators 58. Four (4) Z-axis counter-load floating cylinders 62 are positioned about each corner of the oscillation block 52 for countering the load of the Z-axis forge actuators 56. The oscillation block 52 further provides the mounting surface for a clamping tool 64 for clamping the reinforcing members 14 for oscillation. The oscillation block 52 is maintained between the Y-axis hydrostatic oscillation actuators 54, the hydrostatic forge and counter-load actuators in the X-axis, 58 and 60, and the hydrostatic forge actuators and counter load cylinders in the Z-axis, 56 and 62. Each of the plurality of hydrostatic actuators are preferably equipped with servo-valves, for actuation, and pressure and position feedback sensors. The hydrostatic oscillation actuators are preferably provided with an accelerometer for velocity feedback.

Figure 7:
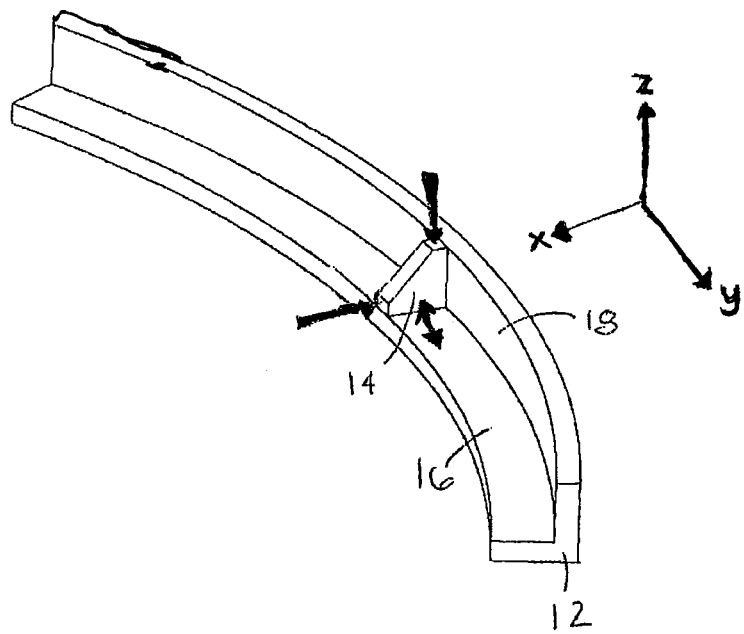
FIG. 7 is a perspective view illustrating the forging forces applied to a reinforcing member to be right-angle welded to profile that has been formed.

According to some embodiments, in order to affix the reinforcing members 14 to the base member to form the structural component 10, each reinforcing member 14 is clamped in the welding head 50 and placed in contact with the bottom wall 16 and sidewall 18 of the base member 12, which is securely mounted in a manner to receive the reinforcing member 14 in the welding head 50. As shown in FIG. 7, the reinforcing member 14 is to be right-angle welded to the base member 12 along the planes defined by interior surfaces of the bottom wall 16 and the sidewall 18, respectively. In particular, the X-axis forge actuators 58 provide a forge load along the X-axis forge axis direction. The X-axis counter load and hydrostatic bearing actuators 60 provide the counter load force to develop the required preload on the hydrostatic bearings in the X-axis. This arrangement restrains the oscillation block 52 in the X-axis while allowing the forge actuators 58 to position and maintain control in the X-axis with no load applied to the welding head 50.

The Z-axis forge actuators 56 provide a forge load along the Z-axis forge axis direction. Again, a preload is required for the hydrostatic bearings that are integral to the hydrostatic actuators. The Z-axis counter load cylinders 62 provide a force to counter load the oscillation block's weight and the hydrostatic forge actuators' preload to retain the oscillation block 52 in the welding head housing. This arrangement allows the hydrostatic forge actuators to control position in the Z-axis with no load applied to the welding head 50. The combined movement of any two (2) sets of actuators provides one plane of motion. The three (3) sets of orthogonal actuators result in three (3) planes of welding head movement. The hydrostatic oscillation actuators provide high-frequency reciprocating Y-axis movement of the head.

Generally regarding the dual axis forging welding process, with the oscillation block in movement, preset (conditioning) forge loads are applied in the Z-axis and X-axis directions from zero to ninety degrees relative to the weld interfaces, preferably substantially perpendicular. With the oscillation motion and the loads applied, the resulting friction heats the weld interfaces to the plastic state of the material. Material is expelled from the weld interfaces, thereby cleaning the weld surface. Each forge axis displacement is monitored by the control system to determine the amount of material displaced, i.e., consumed, during the cleaning process. When the preset cleaning displacement is reached, the oscillation amplitude is reduced to zero to position the part for the final forge motion. At or near zero oscillation, the preset final forging load is applied in the Z- and X-axis directions. The applied forge loads force the parts together. According to some embodiments, the magnitude of the forge load depends on the length of the weld. For example, in the event the weld to the sidewall is three (3) times longer than the weld to the bottom wall, the force load required along the forge axis of the sidewall would need to be about three (3) times greater in magnitude than the force load along the forge axis of the bottom wall. Upon applying the forge load, the forge loading pressure is held relatively constant. The forge displacement may be monitored and recorded. As the material cools and solidifies the forge displacement stops. The forge load is maintained for a preset time after the forge displacement stops to ensure part positioning and weld quality. The final welding head position may be recorded, the forge pressure is reduced to zero, the part clamp is released and the welding head retracted, thus completing the welding cycle. Thus, utilizing the just-described dual forge axis linear friction welding process, the reinforcing members 14 are affixed to the base member 12 to form the structural component 10.

In other embodiments, a single forge axis linear friction welding process may be utilized to affix the reinforcing members 14 to the base member 12 to form the structural component 10. Indeed, according to some embodiments, the reinforcing members 14, the tabs 22 and/or fins 24 all may be affixed to the base member 12 using either dual forge axis linear friction welding or single forge axis linear friction welding. For example, the reinforcing member 14 may be affixed to the base member 12 using dual forge axis linear friction welding and the desired tabs 22 and fins 24 may be affixed to the base member 12 using single forge axis linear friction welding. Rather than being right-angle welded to the base member 12 in the space between the bottom wall 16 and sidewall 18, the tabs 22 and/or fins 24 are welded to a single plane defined by an edge of the bottom wall 16 or sidewall 18, making single forge axis linear friction welding an appropriate choice for affixing such tabs 22 and/or fins 24.

Single forge axis linear friction welding is accomplished in a similar manner to the dual forge axis linear friction welding described hereinabove, except that only a single forge load is applied by the welding head 60 in one direction, rather than two loads in both the X-axis and Z-axis directions. For example, there may be a single forge load applied in the Z-axis direction. In such embodiments, the welding head 60 may not be equipped with X-axis forge actuators 58 or X-axis counter load and hydrostatic bearing actuators 60. Oscillation of the component to be affixed still occurs in the Y-axis direction through use of the Y-axis hydrostatic oscillation actuators 54, and the oscillation amplitude is still reduced to zero when the preset cleaning displacement is reached in order to position the component for the final forge motion. At or near zero oscillation, the preset final forging load is applied in the Z-axis direction only, which forces the component onto the base member 12. Upon applying the forge load in the Z-axis direction, the forge loading pressure is maintained for a preset time after the forge displacement stops to ensure part positioning and weld quality. Thus, single forge axis linear friction welding may be utilized as an alternative or a complement to the dual forge axis linear friction welding described herein to affix one or more of the reinforcing members 14, tabs 22, and fins 24 to the base member 12.

Advantageously, the reinforcing members 14, tabs 22, and fins 24 that are affixed to the base member 12 may be formed of a variety of metals and metal alloys. In this regard, the reinforcing members 14, tabs 22, fins 24 and the base member 12 may be formed of the same or different metals and metal alloys. In one embodiment, the base member 12 and the member being affixed to the base member 12 are each formed of an "unweldable" material, which is a material that possesses high conductivity and quickly dissipates heat away from the weld joint and/or that exhibits cracking along the weld joint as a result of stresses caused by thermal expansion. Unweldable materials produce relatively weak weld joints when welded using conventional fusion welding processes and, thus, are for the most part unavailable to designers of high-performance, structural applications, such as the aerospace industry. Such materials can include titanium, aluminum, aluminum alloys, and some alloys of titanium, particularly Ti-6Al-4V, AA 2000 and 7000 series alloys. Advantageously, many of these materials possess special corrosion, fatigue, strength, or ductility characteristics that are desired in certain applications, particularly the aerospace industry.

The oscillation between the reinforcing member 14 and the base member 12 (or tab 22 or fin 24, as applicable) generates sufficient frictional heat to raise the temperature of the portions of each member adjacent the contact area to between approximately 700° F. and a temperature just below the solidus of the metal forming the reinforcing member 14 and the base member 12. Linear friction welding creates a severely deformed, but highly refined grain structure at the weld interface with substantially no residual stresses. Further, linear friction welding results in a narrower heat-affected zone compared to any fusion welding process and is not limited to selected alloys with properties that are suitable for conventional welding. Linear friction welding eliminates a number of defects related to conventional welding, such as micro-cracks, poor ductility, lack of fusion, porosity and most importantly, minimization of distortion which can adversely effect the shape and tolerances of the joined component members.

Thus, there has been provided improved structural components and methods of manufacture of structural components that reduce both the amount of raw material required and the subsequent machining operations. Advantageously, the embodiments of the base member and resulting structural components are formed without substantial residual stresses and therefore do not exhibit the disadvantages of conventional structural components such as being prone to failure and/or shape changes during further machining or use, and/or have weaker bonds between the base piece and the combined elements than would be preferred.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A method for manufacturing a structural component, the method comprising:
    forming a base member such that the base member comprises at least two sidewalls and a space therebetween;
    hot stretch forming the base member so that the base member has a predetermined curvilinear configuration;
    linear friction welding at least one reinforcing member to the at least two sidewalls so that the reinforcing member is positioned at least partially within the space between the at least two sidewalls; and
    wherein the portions of the at least two sidewalls of the base member to which the at least one reinforcing member is linear friction welded have substantially no residual stress immediately prior to the at least one reinforcing member being linear friction welded.

2. A method according to claim 1 wherein at least one of the base member and reinforcing member is formed of titanium or a titanium alloy.

3. A method according to claim 1 wherein at least one of the base member and reinforcing member is formed of aluminum or an aluminum alloy.

4. A method according to claim 1 wherein the base member and reinforcing member are formed of the same material.

5. A method according to claim 1 wherein the base member and reinforcing member are formed of different materials.

6. A method for manufacturing a structural component, the method comprising:
    positioning a profile comprising at least two sidewalls and a space therebetween in a heat-insulating enclosure in which a die is disposed such that the profile is in forming proximity to the die;
    resistance heating the profile to a working temperature by passing electrical current through the profile;
    moving the profile and the die relative to each other while the profile is at the working temperature, thereby forming a base member comprising the at least two sidewalls and the space therebetween and having a predetermined curvilinear configuration formed using hot stretch forming;
    mounting the curvilinear base member on a mounting assembly;
    affixing a reinforcing member to the at least two sidewalls using linear friction welding so that the reinforcing member is positioned at least partially within the space between the at least two sidewalls; and
    wherein the portions of the at least two sidewalls of the base member to which the at least one reinforcing member is linear friction welded have substantially no residual stress immediately prior to the at least one reinforcing member being linear friction welded.

7. A method according to claim 6, wherein the affixing step comprises:
    positioning the reinforcing member in contact with the base member to define a first interface between the reinforcing member and a first sidewall and a second interface between the reinforcing member and a second sidewall;
    applying a first forge load at an angle relative to the first weld interface and a second forge load at an angle relative to the second weld interface, the first and second forge loads having predetermined magnitudes;
    oscillating the reinforcing member at a predetermined oscillation amplitude to heat the reinforcing member and the base member;
    reducing the oscillation amplitude to zero;
    increasing the first and second forge loads to predetermined set-points and maintaining for a predetermined period of time; and
    reducing the first and second forge loads to zero.

8. A method according to claim 6 wherein at least one of the base member and reinforcing member is formed of titanium or a titanium alloy.

9. A method according to claim 6 wherein at least one of the base member and the reinforcing member is formed of aluminum or an aluminum alloy.

10. A method according to claim 6 wherein the base member and reinforcing member are formed of the same material.

11. A method according to claim 6 wherein the base member and reinforcing member are formed of different materials.

12. A structural component, comprising:
a base member comprising at least two sidewalls and a space therebetween, the base member having a predetermined curvilinear configuration formed using hot stretch forming;
at least one reinforcing member linear friction welded to the at least two sidewalls so that the reinforcing member is positioned at least partially within the space between the at least two sidewalls; and
wherein the portions of the at least two sidewalls of the base member to which the at least one reinforcing member is linear friction welded have substantially no residual stress immediately prior to the at least one reinforcing member being linear friction welded.

13. A structural component according to claim 12 wherein at least one of the base member and the reinforcing member is formed of titanium or a titanium alloy.

14. A structural component according to claim 12 wherein at least one of the base member and the reinforcing member is formed of aluminum or an aluminum alloy.

15. A structural component according to claim 12 wherein the base member and reinforcing member are formed of the same material.

16. A structural component according to claim 12 wherein the base member and reinforcing member are formed of different materials.

17. A structural component, comprising:
a base member, wherein the base member is formed by:
positioning a profile comprising at least two sidewalls and a space therebetween in a heat-insulating enclosure in which a die is disposed such that the profile is in forming proximity to the die;
resistance heating the profile to a working temperature by passing electrical current through the profile; and
moving the profile and the die relative to each other while the profile is at the working temperature; and
at least one reinforcing member affixed to the base member, wherein the reinforcing member is affixed by:
positioning the reinforcing member in contact with the base member to define a first interface between the reinforcing member and a first sidewall and a second interface between the reinforcing member and a second sidewall;
applying a first forge load at an angle relative to the first weld interface and a second forge load at an angle relative to the second weld interface, the first and second forge loads having predetermined magnitudes;
oscillating the reinforcing member at a predetermined oscillation amplitude to heat the reinforcing member and the base member;
reducing the oscillation amplitude to zero;
increasing the first and second forge loads to predetermined set-points and maintaining for a predetermined period of time;
reducing the first and second forge loads to zero; and
wherein the portions of the at least two sidewalls of the base member to which the at least one reinforcing member is linear friction welded have substantially no residual stress immediately prior to the at least one reinforcing member being linear friction welded.

18. A structural component according to claim 17 wherein at least one of the base member and the reinforcing member is formed of titanium or a titanium alloy.

19. A structural component according to claim 17 wherein at least one of the base member and the reinforcing member is formed of aluminum or an aluminum alloy.

20. A structural component according to claim 17 wherein the base member and reinforcing member are formed of the same material.

21. A structural component according to claim 17 wherein the base member and reinforcing member are formed of different materials.

* * * * *